June 7, 1955  J. E. HALL  2,710,198
WHEEL SUSPENSION FOR TRAILERS
Filed Nov. 15, 1952  2 Sheets-Sheet 2
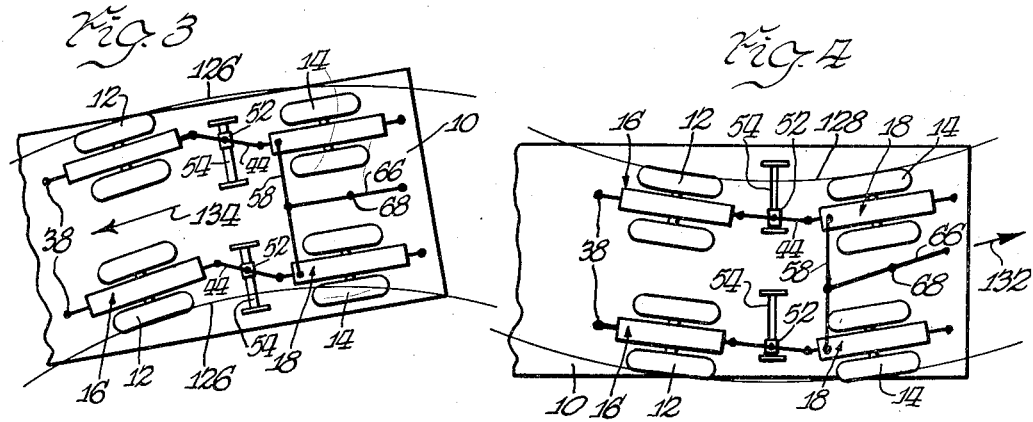
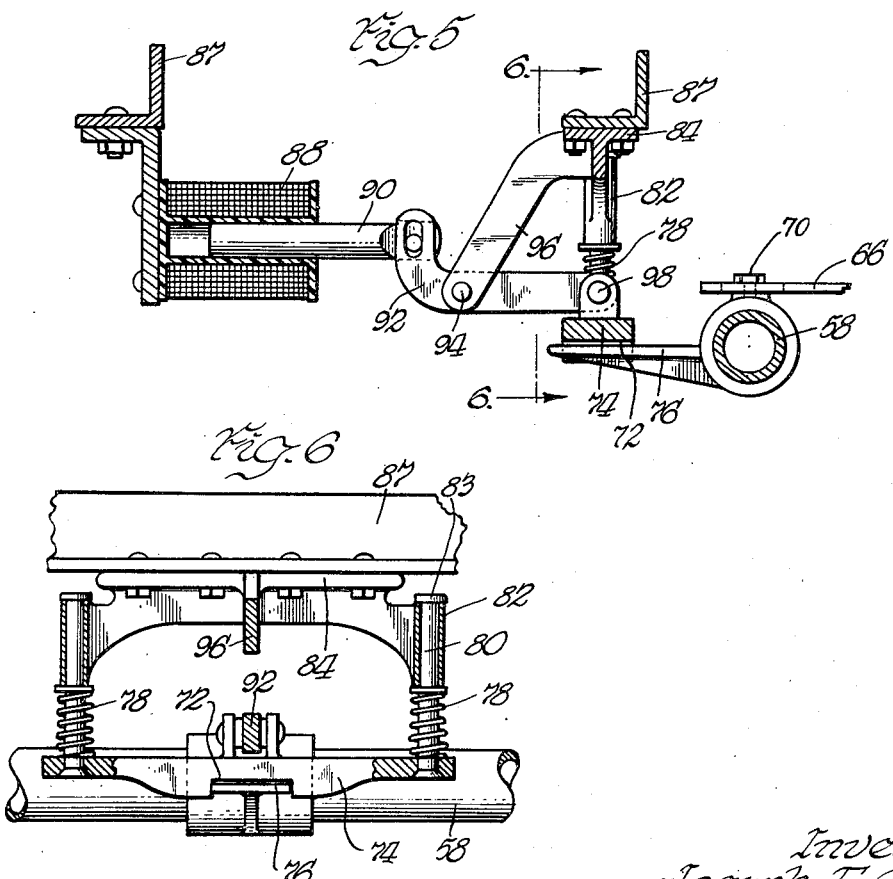
Inventor
Joseph E. Hall
by Bair, Freeman & Molinare
Attys.

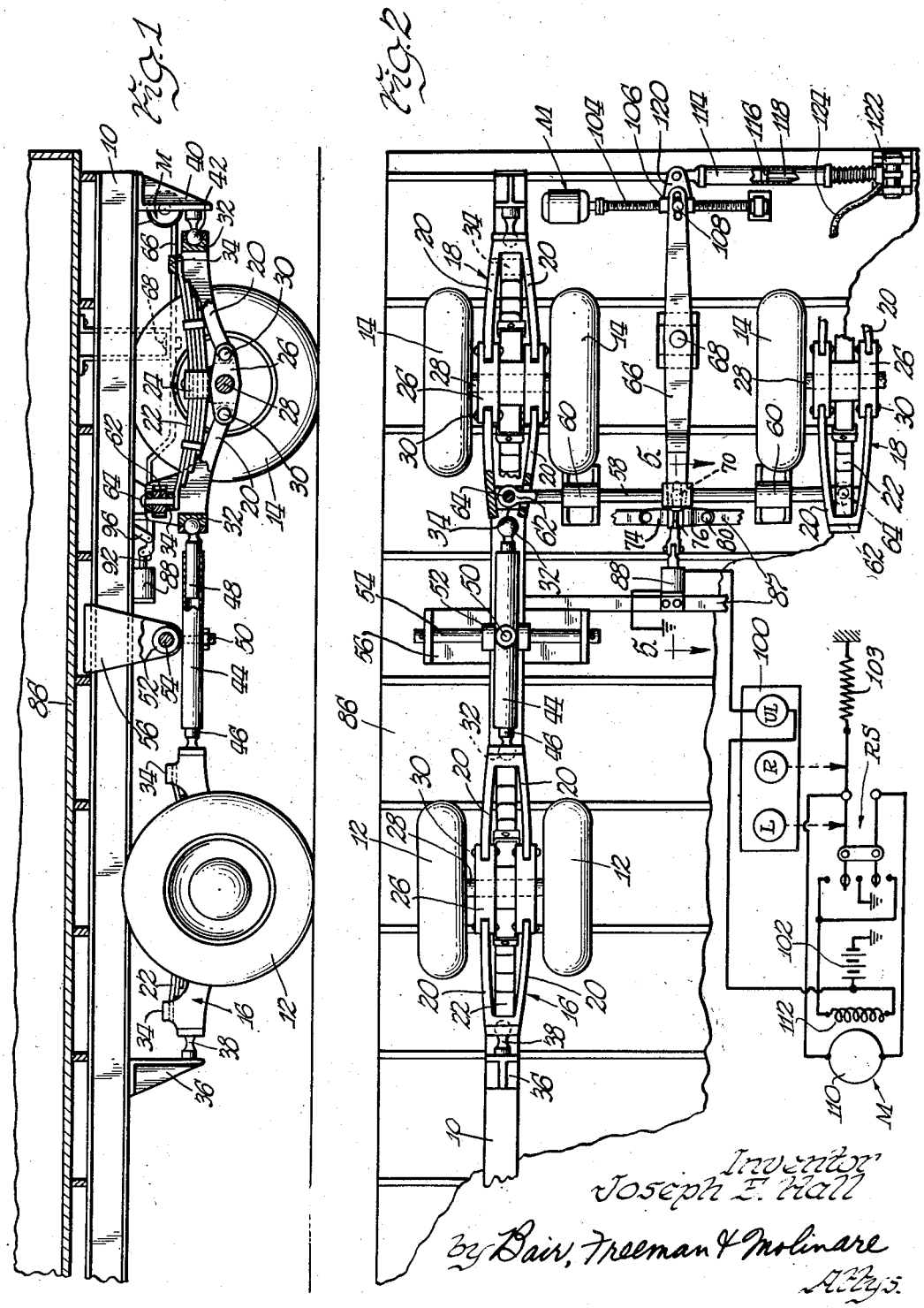

United States Patent Office 2,710,198
Patented June 7, 1955

2,710,198

WHEEL SUSPENSION FOR TRAILERS

Joseph E. Hall, Waterloo, Iowa

Application November 15, 1952, Serial No. 320,778

7 Claims. (Cl. 280—81.5)

This invention relates to a steerable wheel suspension for trailers, semi-trailers and the like.

One object of the invention is to provide an arrangement of fore and aft wheels wherein the fore wheel suspensions are pivotally mounted for castering and the aft wheel suspensions are mounted for steering when desired, the aft wheel suspensions being normally locked and capable of being unlocked for the steering action.

Another object is to provide an interconnection between the fore and aft wheel suspensions which permits castering of the fore wheels normally and likewise castering thereof when the aft wheels are steered as when backing up the trailer.

Still another object is to provide a steerable wheel suspension for trailers wherein there are two pairs of fore wheels and two pairs of aft wheels, with fore and aft beams for mounting them so that they will properly follow the ground surface with certain of the wheels castering during operation on a curved road, the arrangement being such that steering is permitted to facilitate handling of the trailer when backing up.

More specifically an object of the invention is to provide a wheel suspension wherein there are fore beams and aft beams for the fore wheels and aft wheels, with the forward ends of the fore beams and the rearward ends of the aft beams pivoted to the trailer chassis for castering and steering action, and walking beams are connected between the adjacent ends of the fore and aft beams, the walking beams intermediate their ends being pivoted to slidable mounts capable of lateral sliding with relation to the chassis of the trailer and all the pivots being of ball-and-socket or similar universal type to allow the desired action as well as to permit proper following of the wheels relative to the surface over which they travel.

A further object is to provide readily operable and readily controllable locking, unlocking and steering means for the aft wheels.

With these and other objects in view, my invention consists in the construction, arrangement and combination of the various parts of my wheel suspension for trailers, whereby the objects contemplated are attained, as hereinafter more fully set forth, pointed out in my claims and illustrated in the accompanying drawings, wherein:

Figure 1 is a side elevation partly in section of a wheel suspension for trailers embodying my present invention.

Figure 2 is a bottom plan view of the same, parts being broken away, and other parts being shown in section to show details, an electrodiagram being included in the figure for the control of the locking and unlocking means for the steering mechanism and for a steering motor thereof.

Figures 3 and 4 are diagrammatic bottom plan views similar to Figure 2 showing the action of the wheel suspension during forward and back-up movements respectively of the trailer.

Figure 5 is an enlarged detail sectional view on the line 5—5 of Figure 2; and

Figure 6 is a detail sectional view on the line 6—6 of Figure 5.

On the accompanying drawings I have used the reference numeral 10 to indicate the chassis of a semitrailer. For supporting the chassis 10, I provide two pairs of fore wheels 12 and two pairs of aft wheels 14, the terms "fore" and "aft" being merely relative and applied for convenience to the groups of wheels 12 and 14 in relation to each other and not in relation to the fore and aft ends of the chassis 10.

Fore beams 16 and aft beams 18 are provided for the fore and aft wheels and each beam comprises side links 20 and springs 22. The centers of the springs are clamped as at 24 to axle supports 26 through which axles 28 extend for the wheels 12 and 14. The links 20 are each pivoted at 30 to the supports 26 and are provided with sockets 32 in their outer ends. Adjacent the outer ends of the links 20 cross bars 34 serve as spring pads for the springs 22.

The forward ends of the fore beams 16 are pivoted to the chassis 10 by means of brackets 36 supporting balls 38 for their sockets 32. Likewise the rear ends of the aft beams 18 are mounted on balls 42 of brackets 40 and are thus pivoted to the chassis.

Intermediate the fore and aft beams 16 and 18 are walking beams 44 in which are slidably mounted ball elements 46 and 48 for the adjacent ends of the fore and aft beams 16 and 18 respectively. The walking beams 44 are pivoted at 50 to sliding mounts 52 which in turn are slidable on rods 54 supported by brackets 56. The walking beams 44 are thus laterally slidable relative to the chassis 10.

I provide a link connection 58 between the forward ends of the aft beams 18 which link connection has hubs 62 at its ends pivoted on pins 64 carried by the aft beams. A steering arm 66 is provided for the link connection 58, the arm being pivoted to the chassis 10 as at 68 and to the link as at 70. This arm, however, is normally locked in a central position as by a notch 72 of a lock bar 74 engaging over a locking lug 76 (see Figures 5 and 6). Such engagement is effected by a pair of springs 78 on rods 80 that support the lock bar 74, the rods being slidable in sleeves 82 and provided with stop heads 83. The sleeves 82 are supported by a bracket 84, which in turn may be supported on a cross bar 87 of the trailer chassis 10.

For unlocking the steering lever 66 to permit steering, suitable means may be provided such as a solenoid 88, a plunger 90, and a lever 92 pivoted at 94 to an arm 96 of the bracket 84, the lever 92 being also pivoted at 98 to the locking bar 74. The circuit for the solenoid 88 is shown in Figure 2. A control panel 100 may be mounted on the dash of the truck that pulls the trailer and supports three push button controls L, R and UL. UL is a push button for unlocking purposes as will hereinafter appear, while buttons L and R are for steering left and right.

The truck battery is shown at 102, one side of the circuit being grounded in the usual manner and the other side passing through the push button UL to one side of the solenoid 88. The other side of the solenoid is grounded as illustrated. Accordingly, when the button UL is pushed, the solenoid 88 will be energized and the core 90 thus attracted for lifting the locking bar 74 against the action of the springs 78 to unlock the locking bar. The steering lever 66 may then be actuated.

For actuating the lever 66, I provide steering mechanism comprising a motor M rotating a rod 104 on which a nut 106 is threaded and pivoted at 108 to the steering arm as shown in Figure 2. Obviously rotation of the motor M in one direction will swing the arm 66 in one direction and reverse rotation of the motor will swing it in the opposite direction.

Figure 2 includes the motor electro-diagrammatically as well as physically, 110 being the armature and 112 the field coil. The field coil 112 is connected to the battery 102 and to a reversing switch RS which is normally centered by a spring 103. The switch RS is moved in one direction by the push button L and in the opposite drection by the push button R. Thus the current from the battery 102 is established as to its circuit through the field coil 112 and through the armature 110 in one direction when L is pushed and in the opposite direction through 110 when R is pushed. This rotates the motor M either in one direction or the other as desired, depending on whether the operator is steering to the left or right.

The motor M can be of sufficient strength to accomplish the steering action, but I prefer to use a relatively small motor merely as a pilot and in conjunction therewith a pneumatic booster inasmuch as these are extensively used on trucks equipped with a pneumatic system for operating the brakes of the truck and trailer. These boosters usually comprise a cylinder 114, a piston 116, and a piston rod 118. I connect the booster between an ear 120 of the nut 106 and a stationary bracket 122 on the chassis 10. A pneumatic connection to the cylinder is illustrated at 124. Boosters of this type are sensitive to any movement of the steering arm 66 and the air pressure then comes into play on the piston 116 in the proper direction for assisting the motor M for accomplishing the steering operation.

Referring to Figure 3, the aft beams 18 and their wheels 14 are locked against swiveling movement because of the locking bar 74 being in the normal position shown in Figure 6 with respect to the lug 76. Accordingly, when the trailer is traveling on a curve such as indicated at 126 and in the direction of the arrow 134, the fore beams 16 and the fore wheels 12 only will caster at their front ball and socket joints 38 only. This arrangement reduces side drag on the tires and consequently there is less wear which are advantages in the operation of a trailer or semi-trailer.

When it is desirable to back up the truck and the trailer, the aft wheels 14 may be steered, for instance as in Figure 4 for traversing a curve 128, in the direction of travel then being as indicated by the arrow 132. The left or right buttons L or R may be depressed as desired after the unlocking button UL has been depressed for unlocking the link 58. This energizes the motor M in the proper direction for left or right turning as desired.

The aft wheels 14 in Figure 4 are shown adjusted for left turning and the walking beams 44 will adjust themselves along the rods 54 for the most advantageous position of the fore wheels 12 for castering during backing of the trailer. Likewise when moving forwardly as in Figure 3, the adjustment of the walking beams 44 are automatic as the fore wheels 12 caster. The walking beams and the sliding connections 46—48 permit at all times full flexibility of the wheels 12 and 14 in following the contour of the surface being traveled, and since the beams 16 and 18 are ball-and-socket mounted at their ends, the left and right wheel of any pair may likewise properly follow the surface contour as these joints permit rocking of the beams in a lateral vertical plane.

Some changes may be made in the construction and arrangement of the parts of my wheel suspension for trailers without departing from the real spirit and purpose of my invention, and it is my intention to cover by my claims any modified forms of structure or use of mechanical equivalents which may be reasonably included within their scope.

I claim as my invention:

1. A steerable wheel suspension for a trailer having a chassis comprising two pairs of fore wheels, two pairs of aft wheels, a fore beam for each pair of fore wheels, an aft beam for each pair of aft wheels, said beams being substantially aligned with each other fore and aft of said chassis, the forward ends of said fore beams being universally pivoted to said chassis, the rear ends of said aft beams being universally pivoted to said chassis, means of extensible and universal type connecting the adjacent ends of said fore and aft beams together, and means for swinging said aft beams laterally of said chassis for steering said aft wheels.

2. In a wheel suspension for a trailer having a chassis, fore and aft wheels, a fore beam on which said fore wheels are mounted, an aft beam on which said aft wheels are mounted, said beams being arranged in substantial alignment fore and aft in respect to said chassis, the forward end of said fore beam being universally pivoted to said chassis, the rear end of said aft beam being universally pivoted to said chassis, a walking beam between said fore and aft beams in substantial alignment therewith and having its front end extensibly pivoted to the rear end of said fore beam and its rear end extensibly pivoted to the front end of said aft beam, a mount for said walking beam, a laterally extending support on said chassis along which said mount is slidable, said walking beam intermediate its ends being pivoted to said slidable mount, and said mount being pivoted on said support to provide a connection of universal type between said support and said walking beam, means for normally locking said aft beam against pivotal movement relative to said chassis, means for unlocking said aft beam whereby it may pivot, and means for pivoting said aft beam when unlocked to thereby steer said aft wheels.

3. In a wheel suspension for trailers, fore and aft wheels, a fore beam on which said fore wheels are mounted, an aft beam on which said aft wheels are mounted, said beams being arranged in substantial alignment fore and aft in respect to said chassis, the forward end of said fore beam being universally pivoted to the trailer for swinging movement laterally thereof, the rear end of said aft beam being universally pivoted to the trailer for swinging movement laterally thereof, a walking beam between said fore and aft beams in substantial alignment therewith and having its front end extensibly pivoted to the rear end of said fore beam and its rear end extensibly pivoted to the front end of said aft beam for swinging movement laterally of the trailer, a mount on which said walking beam is pivoted, a laterally extending support on said chassis along which said mount is slidable and on which it may also rock, means for locking and unlocking said aft beam, and means for imparting pivoting movements thereto for steering said aft wheels.

4. A steerable wheel suspension for trailers comprising two pairs of fore wheels, two pairs of aft wheels, a fore beam for each pair of fore wheels, an aft beam for each pair of aft wheels and in substantial alignment with said fore beam, the forward ends of said fore beams and the rear ends of said aft beams being universally pivoted to the trailer, walking beams between said fore and aft beams in substantial alignment therewith and having their ends universally extensibly pivoted thereto, mounts for said walking beams supported on said trailer for lateral sliding movement, said walking beams being pivoted to said laterally slidable mounts and said mounts being rockable on said trailer, means for normally locking said aft beams against pivoting movements and unlocking them at will for pivoting movements, and selectively operable means to impart pivoting movements to said aft beams and thereby steering movements to said aft wheels.

5. In a steerable wheel suspension for a trailer having a chassis, two pairs of fore wheels, two pairs of aft wheels, a fore beam for each pair of fore wheels, an aft beam for each pair of aft wheels and in substantial alignment with said fore beam, the forward ends of said fore beams being universally pivoted to said chassis, the rear ends of said aft beams being universally pivoted to said chassis, walking beams between said fore and aft beams in substantial alignment therewith and having their ends extensibly pivoted thereto, mounts for said walking beams, said walking beams being pivoted intermediate their ends to said mounts and said mounts being laterally slidable and rockable in a vertical plane on said chassis, means for normally locking said aft beams, selectively operable means for unlocking said aft beams, and means for pivoting said aft beams and thereby steering said aft wheels.

6. In a wheel suspension for a trailer having a chassis, fore and aft wheels, fore beams on which said fore wheels are mounted, aft beams on which said aft wheels are mounted, said beams being substantially aligned with each other fore and aft of said chassis, the forward ends of said fore beams and the rear ends of said aft beams being universally connected to said chassis, walking beams between said fore and aft beams in substantial alignment therewith and having their ends extensibly and universally connected thereto, mounts for said walking beams, means on said chassis for supporting said mounts for lateral movement relative to said chassis, said walking beams intermediate their ends being universally connected through said mounts to said last means and means for laterally swinging said aft beams for steering said aft wheels.

7. In a steerable wheel suspension for a trailer having a chassis, two pairs of fore wheels, two pairs of aft wheels, a fore beam for each pair of fore wheels, an aft beam for each pair of aft wheels, said beams being substantially aligned with each other fore and aft of said chassis, ball and socket connections between said chassis and the forward ends of said fore beams, ball and socket connections between said chassis and the rear ends of said aft beams, walking beams between said fore and aft beams substantially aligned therewith and having their ends connected by extensible ball and socket connections therewith, mounts for said walking beams, said walking beams intermediate their ends being pivoted to said mounts, said mounts being laterally movably supported on said chassis and pivoted relative thereto for universal connection of said walking beams to said chassis, a link connection between the forward ends of said aft beams, means for normally locking said link connection against lateral movement, means for unlocking said link connection, and means for moving said link connection longitudinally for swinging said aft beams and thereby imparting steering movement to said aft wheels.

References Cited in the file of this patent
UNITED STATES PATENTS

| | | |
|---|---|---|
| 2,167,943 | Fox | Aug. 1, 1939 |
| 2,182,437 | Jonkhoff | Dec. 5, 1939 |
| 2,361,166 | Ayers | Oct. 24, 1944 |